(No Model.) 3 Sheets—Sheet 1.
J. G. McCORMICK.
ELECTRIC LOCOMOTIVE.
No. 511,448. Patented Dec. 26, 1893.
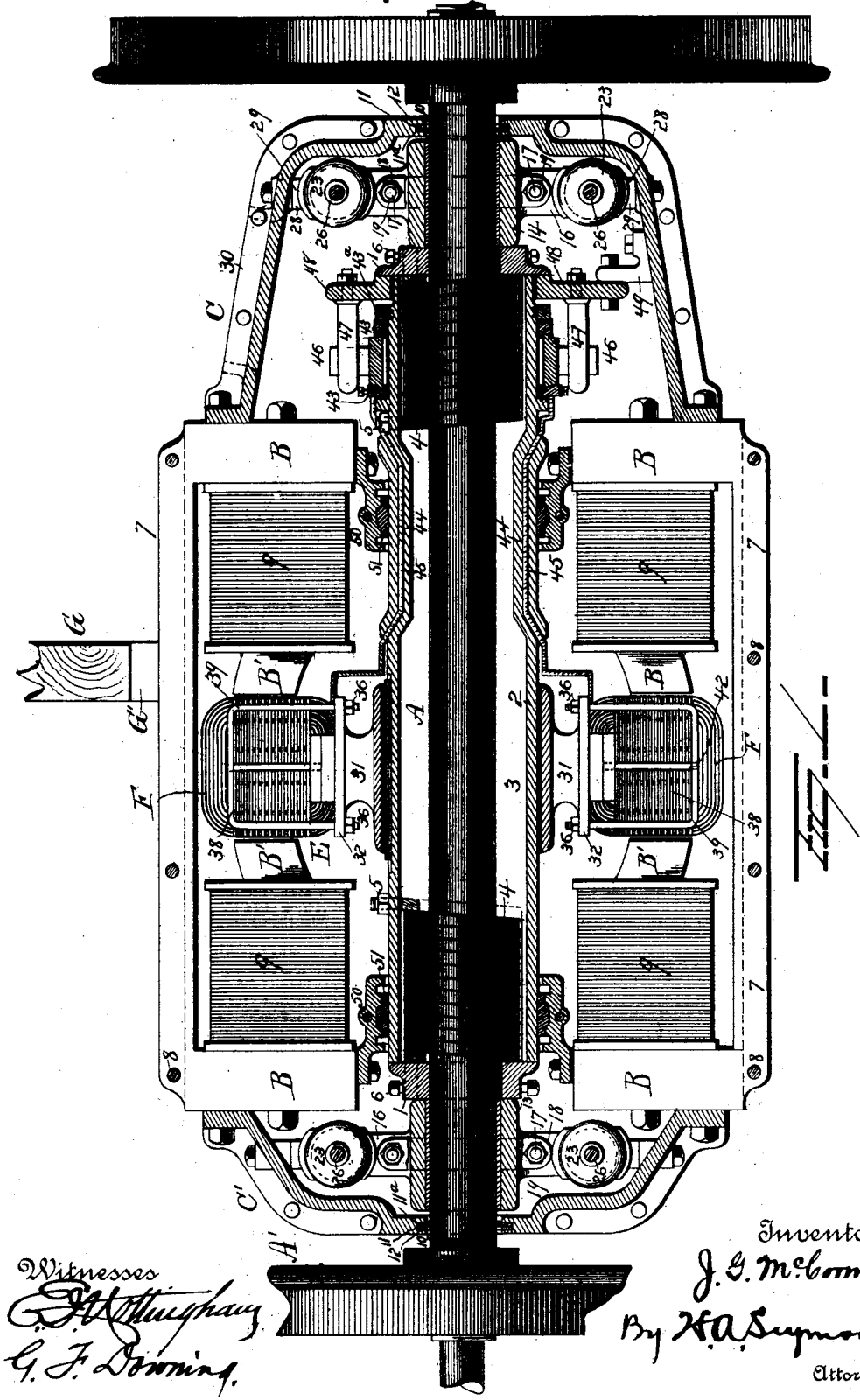
Witnesses
J. A. Hughany
G. F. Downing
Inventor
J. G. McCormick
By H. A. Seymour
Attorney.
THE NATIONAL LITHOGRAPHING COMPANY,
WASHINGTON, D. C.

(No Model.)  3 Sheets—Sheet 2.
J. G. McCORMICK.
ELECTRIC LOCOMOTIVE.
No. 511,448. Patented Dec. 26, 1893.
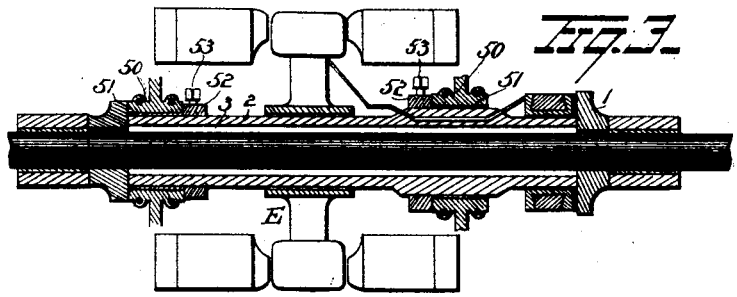
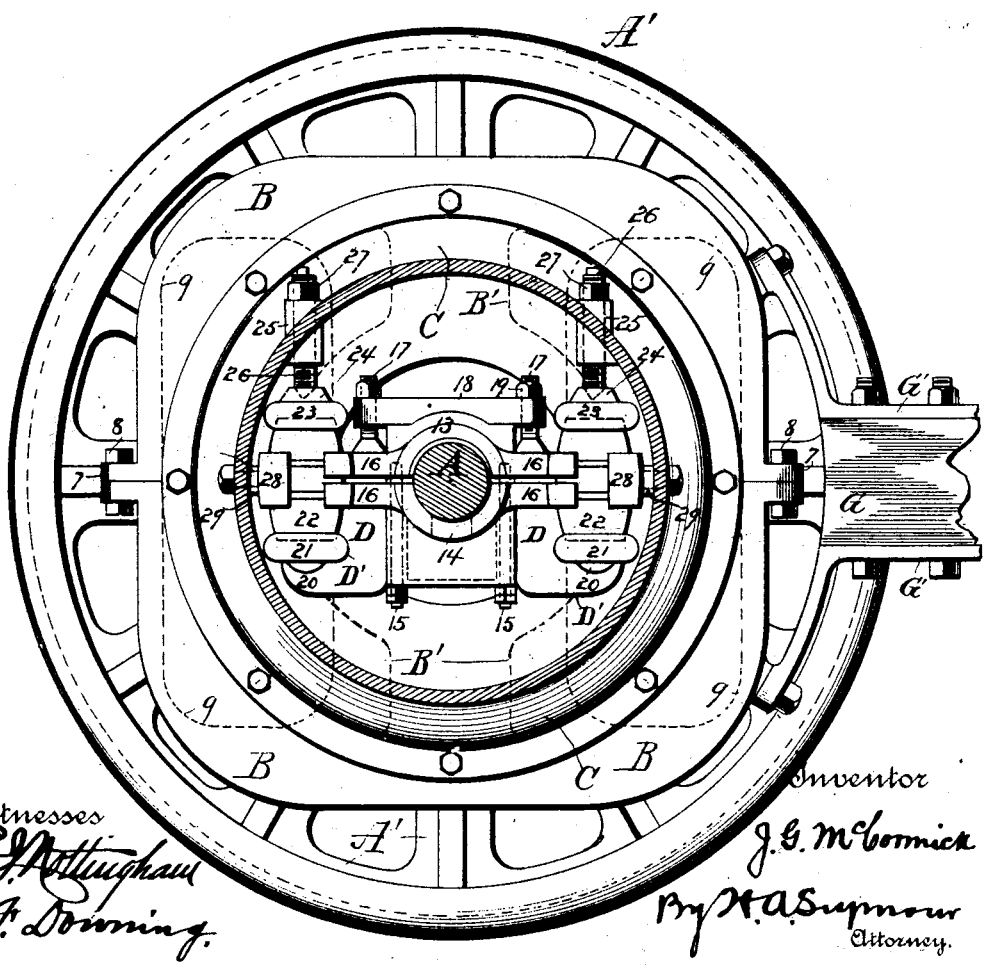

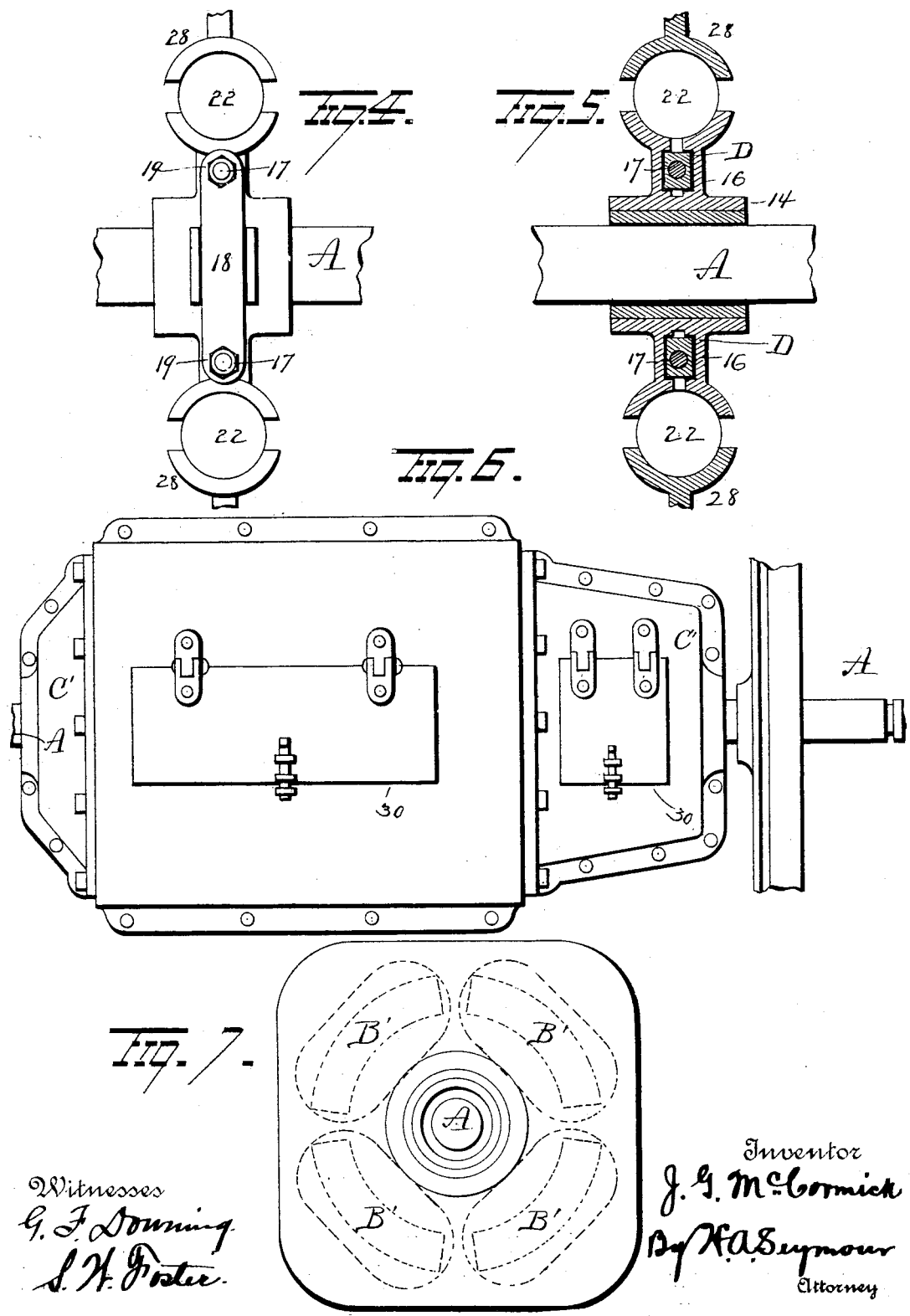

United States Patent Office.

JOHN G. McCORMICK, OF LOUISVILLE, KENTUCKY.

ELECTRIC LOCOMOTIVE.

SPECIFICATION forming part of Letters Patent No. 511,448, dated December 26, 1893.

Application filed April 1, 1892. Serial No. 427,392. (No model.)

*To all whom it may concern:*

Be it known that I, JOHN G. MCCORMICK, a resident of Louisville, in the county of Jefferson and State of Kentucky, have invented certain new and useful Improvements in Electric Motors for Railroad-Cars; and I do hereby declare the following to be a full, clear, and exact description of the invention, such as will enable others skilled in the art to which it appertains to make and use the same.

My invention relates to an improvement in electric motors,—and more particularly to such as are adapted to propelling railway cars,—its object being to mount the armature or revolving member independently upon the axle of the car, in such manner that the force and momentum will be delivered directly to the axle of the car and revolution will be coincident with that of the wheels of the car.

A further object is to provide simple and efficient means for avoiding the shock or jar to the car when heavy currents of electricity are permitted to flow suddenly into the motor.

A further object is to provide means for preventing injurious and annoying effects caused by the impact of the wheels of the car in crossing openings in the rails and also in passing over frogs and switches.

A further object is to provide a casing for protecting the motor from dust and the journal bearings from sand or other injurious matter.

A further object is to provide simple and efficient means for connecting two motors together, insulating them from each other, and preventing the rotation of the field magnets.

A further object is to construct the armature in such manner that it shall be thoroughly ventilated.

A further object is to improve the general construction and arrangement of an electric motor adapted for propelling railroad cars, so that it shall be simple and effective in the performance of its functions.

With these objects in view the invention consists in certain novel features of construction and combinations and arrangements of parts as hereinafter set forth and pointed out in the claims.

In the accompanying drawings: Figure 1 is a plan view partly in section. Fig. 2 is a front end view. Fig. 3 is a view showing supplemental collars on the sleeve or cylinder for preventing longitudinal movement of the same. Figs. 4 and 5 are detail views illustrating the bearings. Fig. 6 is an exterior view of the motor. Fig. 7 is a view of a modification.

A represents the axle of a car and A' the car wheels carried thereby. Secured to the axle A at points removed somewhat inwardly from the wheels A', are collars 1, 1, and surrounding the axle between these collars and bearing at its ends against the same, is a sleeve or cylinder 2, which forms an elongated space or chamber 3 around the axle. In the ends of the space or chamber 3 strong springs 4 are located, said springs being oppositely coiled, so that one will exert a force in one direction and the other exert a counteracting force in the reverse direction. One end of each spring 4, is passed through a perforation in the sleeve or cylinder 2 and screw-threaded for the reception of a nut 5 whereby it is secured. The other ends of said springs are passed into sockets or openings in the fixed collars 1, 1, and retained therein by means of screws 6.

B, B, represent two yokes provided at opposite sides with ears 7, 7, through which bolts 8 are passed to secure said yokes together. Secured to and projecting inwardly from the yokes B are the cores B' of the field magnets, said cores being provided with bobbins 9, wound in the usual manner.

Secured to the ends of the yokes B are casings C, C', each provided with an opening 10 for the passage of the axle A, and the casing C being made somewhat longer than the casing C', so as to provide room for the commutator which is located as presently explained. In the openings 10 in the ends of the casings C, C', grooves 11 are made, in which rings of leather or rubber 11ª or other flexible material are inserted, said rings 11ª being held in place by means of metallic rings 12 cramped into said grooves with the flexible rings 11ª, the latter being adapted to engage the axle and thus exclude dust, &c., from the working parts of the motor.

The yokes B, B, field magnets and casings C, C', are supported upon the axle A by means of journal bearings 13, 14, having anti-friction wearing faces, one arranged above and the other below said axle at each end of the motor, the upper and lower bearings being secured together by means of bolts 15, 15. The bearings 13, 14 are made with laterally projecting arms 16, provided with perforations for the passage of stirrups D, D.

The stirrups D, D, are made at their upper ends with screw threaded shanks 17, which pass through similarly threaded perforations in the ends of a bar 18 located on the upper journal bearing 13 and secured by means of nuts 19. Integral arms D', project laterally from the stirrups D and are provided with concave depressions 20 for the reception of the convex portion of a cap 21. The caps 21 are recessed for the reception of the lower ends of rubber springs or cushions 22, which latter are preferably made larger at their centers than at their ends; in other words, said springs or cushions are made in the shape of barrels. Caps 23 are placed on the upper ends of the springs or cushions 22 and provided with recessed or socketed enlargements 24. Screw threaded bosses 25 are made on the casings C, C', through which screws 26 pass, said screws bearing at their lower ends in the recesses of the enlargements 24 on the caps 23, and provided above the bosses 25 with nuts 27 whereby to retain them in the proper adjustment relatively to the springs or cushions 22. The ends of the laterally projecting arms 16 of the bearings 13, 14 are made concave for the reception of the central portions of the springs or cushions 22. At the opposite sides of the springs or cushions, concave blocks 28 are located and adapted to embrace the said springs or cushions, opposite the ends of the arms 16, said blocks being secured to the casings C, C' by means of suitable shanks 29. From this construction it will be seen that the weight of the motor is supported upon the springs or cushions 22 and from thence to the car axle, the relation of the axle to the parts of the motor supported thereon through the medium of said springs, being regulated and adjusted by means of the screws 26. It will also be seen that a very efficient and complete arrangement will be provided for carrying the motor upon the axle of the car for insulating it therefrom and for securing perfect immunity from injury to the motor or its parts by the elastic action of the springs,—all jars caused by inequalities in the road being taken up by the springs or cushions 22.

Suitable openings 30 will preferably be provided in the casings, whereby access may be had to the operating parts of the motor, so that worn or injured parts may be repaired or removed.

Secured to the sleeve or cylinder 2, at its center, and preferably insulated therefrom, is the armature E. The center or spider 31 of the armature, which is secured to the sleeve or cylinder 2 is provided with lateral flanges 32. On the spider 31, the plates 38 composing the core of the armature are located and held in place by means of stirrups 39, the ends of which pass through the flanges 32 and are provided with nuts 36. The bobbins F are wound in the core in the usual manner.

A commutator F is located on the sleeve or cylinder 2 and preferably insulated therefrom, the supporting blocks 43 of the commutator being provided with recesses for the reception of the dovetailed edges of the plates of the commutator and retained in position by a collar 43ª. The commutator is connected with the bobbins of the armature by means of wires 44, which wires may, in fact, be continuations of the wires forming the bobbins, said wires 44 passing through an opening or passage 45 made in the wall of the sleeve or cylinder 2,—whereby said wires will be properly protected.

The commutator brushes 46 are properly supported by arms 47 carried by a bracket 48,—which latter is properly supported by a bracket 49 secured to the casing C.

Bearing plates 50 are secured to the yokes B and are provided with antifriction wearing faces 51 and suitably insulated from the yokes. Collars 52 may be adjustably secured to the sleeve or cylinder 2 by means of set screws 53 as shown in Fig. 5, and bear against the bearings 50. By this means the armature will, at all times, be maintained in the proper position relatively to the field magnets, without depending on the fixed collars 1, 1.

From the construction and arrangement of parts above set forth, it will be seen that the sleeve or cylinder 2 will be maintained concentric with the axle A, by means of the bearings 50, and that any longitudinal movement of said sleeve or cylinder will be prevented by the fixed collars 1, 1, (also by the collars 52 above referred to,)—said collars 1, 1, being in turn, prevented from endwise movement (should their fastenings to the axle weaken or wear) by the bearing blocks 13, 14.

In order to secure two motors together so as to prevent the rotation of the field magnets and the parts which carry them and support them on the axle, a wooden bar G is employed and secured to the motors by means of arms G', preferably of metal. An arm G' is securely bolted to each side of the bar G, at its ends, and extend therefrom laterally, and secured to the yoke B at points considerably removed from the axle of the motor. By this construction and arrangement of parts the two motors will be thoroughly insulated from each other, and will be securely braced and prevented from any rotary movement whatever. If but one motor is employed, the outer ends of the bars G may be secured to a portion of the truck frame.

By constructing and arranging the parts of the motor as above set forth the motor is rendered simple and compact,—attention being especially directed to great economy of space attained by the arrangement of the springs 4.

In the operation of the motor it will be observed that the sleeve or cylinder 2, and the armature and commutator carried thereby, move independently of the car axle until a sufficient force shall be exerted against the springs 4, when the car axle will begin to rotate. As the springs 4 will be almost constantly in action when the car is in motion, I have designed them to be of great length, comparatively, with a view to diminish the strain, by an increase of folds of the said springs. By the provision of the springs 4 and the construction and arrangement thereof as above explained, there will be no jerking or jarring effect produced in starting the car, but on the contrary the car will be started easily and gradually, thereby relieving undue strain upon the parts of the motor.

By the construction and arrangement of the motor a great diameter of armature will be afforded with a corresponding height of the car wheels. It will also be seen that there will be no weight except the armature and commutator brought to bear on the sleeve or cylinder 2, and that as the longitudinal movement of said sleeve is prevented by the fixed collars 1, 1, as above explained the armature carried by said sleeve will always be maintained in proper relation to the field magnets. It will further be seen that the armature and the field are insulated from the shaft or axle.

I have shown and described but two field magnets, but it is evident that a greater number can be employed if desired.

Having fully described my invention, what I claim as new, and desire to secure by Letters Patent, is—

1. In an electric locomotive, the combination with an axle or shaft and field magnets supported thereby, of a sleeve surrounding said axle or shaft, fixed collars on the axle at the ends of the sleeve, springs within the sleeve and secured at their respective ends to the sleeve and fixed collars, and an armature carried by said sleeve, substantially as set forth.

2. In an electric locomotive, the combination with an axle or shaft and field magnets supported thereby, of a sleeve surrounding said axle or shaft, fixed collars on the axle at the ends of said sleeve, springs within said sleeve and secured at their respective ends to the sleeve and fixed collars, an armature carried by said sleeve, and a commutator also carried by said sleeve, substantially as set forth.

3. In an electric locomotive the combination with a shaft or axle, and field magnets, of a sleeve surrounding said shaft or axle and having a yielding connection therewith, an armature carried by said sleeve, a commutator also carried by the sleeve, said sleeve being made with an opening or passage for the accommodation of the wires from the bobbins of the armature to the commutator, substantially as set forth.

4. In an electric locomotive, the combination with a shaft or axle and field magnets supported thereby, of a sleeve or cylinder surrounding said shaft or axle, an armature carried by said sleeve or cylinder, bearing blocks secured to the yokes of the field magnets, and anti-friction material inserted in said bearing blocks and adapted to bear on said sleeve or cylinder, whereby the latter is maintained concentric with the shaft or axle, substantially as set forth.

5. In an electric motor, the combination with a shaft or axle and an armature adapted to rotate with said shaft or axle, of yokes carrying field magnets, a casing at the end of each yoke adapted to permit the passage of the shaft or axle through them, and a yielding connection between said casings and the axle or shaft, substantially as set forth.

6. The combination with a shaft or axle, and an armature, of yokes carrying field magnets, casings secured at the ends of said yokes and provided with openings for the passage of the shaft or axle, a ring of insulating material inserted in said openings and adapted to exclude dust &c. from the interior of the casings, and a yielding connection between said casings and the shaft or axle, substantially as set forth.

7. In an electric motor, the combination with a shaft or axle and an armature, of yokes carrying field magnets, casings secured to the ends of said yokes and having openings for the passage of the shaft or axle, bearings on said axle, stirrups connected with and supported by said bearings, springs or cushions supported by said stirrups, and a connection between said springs or cushions and the casings, substantially as set forth.

8. In an electric motor, the combination with a shaft or axle and an armature, of yokes carrying field magnets, casings secured to said yokes and having openings for the passage of the shaft or axle, bearings on said axle, stirrups connected with and supported by said bearings springs or cushions on the stirrups, and an adjustable connection between said springs or cushions and the casings, substantially as set forth.

9. In an electric motor, the combination with a shaft or axle and an armature, of yokes carrying field magnets, casings secured to said yokes and having openings for the passage of the shaft or axle, bearings on said axle, a bar on the upper portion of said bearings, stirrups secured to said bar, springs or cushions supported by said stirrups, and a connection between said springs and the casings, substantially as set forth.

10. In an electric motor, the combination with a shaft or axle and an armature, of yokes carrying field magnets, casings secured to said yokes, bearings on the axle, a bar located on the upper one of said bearings, stirrups secured to the ends of said bars, springs or cushions supported by said stirrups, screw-threaded bosses on the casings and screws passing through said screwthreaded bosses and having a pivotal bearing on said springs or cushions, substantially as set forth.

11. In an electric motor, the combination with a shaft or axle and an armature, of yokes carrying field magnets, casings secured to said yokes, bearings on the axle, stirrups supported by said bearings, a cap located on and carried by each stirrup, springs or cushions located on said caps, caps on top of said springs or cushions, screw threaded bosses on the casings and screws passing through said bosses and having a pivotal bearing on the last mentioned caps, substantially as set forth.

12. In an electric motor, the combination with a shaft or axle, and an armature, of yokes carrying field magnets, bearings on said shaft or axle and a yielding connection between said bearings and the casings, said yielding connection being so arranged as to have a horizontal and a vertical yielding action relatively to the casings and the said bearings, substantially as set forth.

13. In an electric motor, the combination with a shaft or axle and an armature, of yokes carrying field magnets, casings secured to said yokes, bearings on the axle or shaft, stirrups supported by said yokes, springs or cushions carried by said stirrups, a vertical connection between said springs or cushions and the casings, said bearings also having a horizontal bearing on said springs or cushions, and bearing blocks secured to the casings and adapted to bear against said springs or cushions opposite the contact of the bearings on the axle or shaft with said springs or cushions, substantially as set forth.

14. In an electric motor, the combination with a shaft or axle and an armature, of yokes carrying field magnets, a yielding connection between said casings and the shaft or axle, said casings being made with openings whereby access may be had to the interiors of the casings, substantially as set forth.

15. In an electric motor, the combination with a shaft or axle, of a sleeve adapted to surround the axle or shaft and having a yielding connection therewith, fixed collars on the axle or shaft adapted to bear against the ends of the sleeve, yokes carrying field magnets, casings secured to said yokes, bearings located on the axle and bearing against said fixed collars, and a connection between said bearings and the casings, substantially as set forth.

16. The combination with a shaft or axle and an electric motor mounted thereon, of a bar for preventing the rotation of the field of said motor, and arms secured at one end to said bar and at their other ends made to embrace the frame or casing of the motor, and secured thereto, substantially as set forth.

17. In an electric motor, the combination with field magnets, of a sleeve carrying an armature, bearings carried by the field magnets and adapted to bear against the sleeve, and collars adjustably secured to the sleeve and adapted to bear against the bearings, substantially as set forth.

In testimony whereof I have signed this specification in the presence of two subscribing witnesses.

JOHN G. McCORMICK.

Witnesses:
ED. H. SHELMAN,
J. E. KENT.